USO05205277A

United States Patent [19]

Chao-Tsung

[11] Patent Number: 5,205,277
[45] Date of Patent: Apr. 27, 1993

[54] FOOD HEATING TECHNIQUE FOR PRODUCING HIGH TEMPERATURE

[76] Inventor: Chen Chao-Tsung, No. 58-1, Sec. 2., Tan Fu Rd., Tan Tsu Hsiang, Taichung Hsien, Taiwan

[21] Appl. No.: 872,148

[22] Filed: Apr. 22, 1992

[51] Int. Cl.⁵ ........................................... A47G 23/04
[52] U.S. Cl. ..................................... 126/262; 126/263
[58] Field of Search ............... 126/263, 246, 262, 261; 426/109, 113, 114; 206/222, 219

[56] References Cited

U.S. PATENT DOCUMENTS

| | | | |
|---|---|---|---|
| 1,971,364 | 8/1934 | Zimmer et al. | 126/263 |
| 4,559,921 | 12/1985 | Benmussa | 126/263 |
| 4,762,113 | 8/1988 | Hamasaki | 126/263 |

Primary Examiner—James C. Yeung
Attorney, Agent, or Firm—Larson & Taylor

[57] ABSTRACT

The present invention relates to a high temperature heating technique and container for foods. The container comprises principally quicklime, which is the main component for raising the temperature, a medium temperature heating pack, a high temperature heating pack and a heater lid. The medium temperature heating pack includes a temperature raising liquid for creating a first stage of temperature increase by reacting the quicklime, while the high temperature heating pack includes a temperature raising liquid for creating a second stage of temperature increase. The heater lid contains probes which release the temperature raising liquid in the medium temperature heating packs and the chemical reaction to produce heat which in turn melts the covering of the high temperature heating pack releasing its liquids. These liquids in turn react with the surrounding quicklime to produce a high temperature of up to 250° C. in a very short time.

13 Claims, 7 Drawing Sheets

FOOD HEATING TECHNIQUE FOR PRODUCING HIGH TEMPERATURE

BACKGROUND OF THE INVENTION

The present invention relates to a high temperature heating technique for food, and particularly to a novel invention which can produce a high temperature of up to 250° C., can reduce food heating time, can diminish the residual bacteria in food by such high temperature, yet can also get rid of environmental contamination and allow the users to eat safely.

During these times, the quality of life has been gradually increasing, and the lives of people have been getting busier with the free time seeming to be always inadequate. There have been fast foods, quick lunches, etc. for resolving the time problem. Also there has been a lot of automatic heated foods suitable for take out, such foods being capable of being automatically heatable so as to be hot and edible when they are eaten. All of these can suit people's convenience. However, the automatically heated foods available in the market have too long of a heating time (from several minutes to about 10 minutes in order to get the predetermined temperature). For example, for 50 g quicklime plus 10 cc normal water (50 g CaO 10 cc $H_2O$), it takes 3 minutes to get the predetermined temperature. Yet the temperature thereof is not very high (from more than 80° C. to about 200° C.). For example, for 50 g quicklime plus about 8 cc distilled water plus about 0.3 g salt (50 g CaO(s), about 8 cc $H_2O$ (1), and about 0.3 g Nacl (s)), the temperature thereof rises to only 200° C. Besides, the prior art containers have only one pressing pin provided on a heater lid, so that when the pressing pin pierces the water bag, water in the bag can flow out only from a small hole. The result is that the heat reaction therefrom can not proceed rapidly and the heating effect is hence reduced. (See FIGS. 1 and 2.) Consequently, the whole heating effect is bad. Also, if the foods are kept at a high temperature for quite a long time, they will degenerate (like in the case of hot beverages in a vending machine). The consumers thereof are subject to injury after eating them. Further, the reaction products of the chemical heating reaction are not all absorbable by Nature, and they may include toxic materials, so as to contaminate the environment.

SUMMARY OF THE INVENTION

The inventor knew well the above stated disadvantages, and spent a lot of time, money and effort to undertake a hard study. After many versions, the inventor finally made this invention. The principal object of the present invention is to take advantage of the unique device which includes quicklime, medium and high temperature heating packs and a heater lid. A pressing pin and a protruding piercing body on the heater lid can pierce through a medium temperature pack, such that the temperature of a raising liquid in the medium and the high temperature heating packs can be mixed rapidly with quicklime and produce a conventional chemical reaction. Thus there will be achieved a high temperature of up to 250° C. after a very short time. This not only reduces the heating time of foods, but also the high temperature diminishes the residual bacteria in these foods, and may prevent the foods from degenerating from a lengthy heating. Thus the present invention provides consumers with hot and safe edible foods. Such device uses heating materials which can be absorbed by Nature, are not toxic, and will not contaminate the environment.

In order to achieve the above mentioned objectives, the technical approaches and the features thereof will be described according to the attached drawings as described below:

DETAILED DESCRIPTION OF THE PREFERRED EMBODIMENTS

Figure 1:
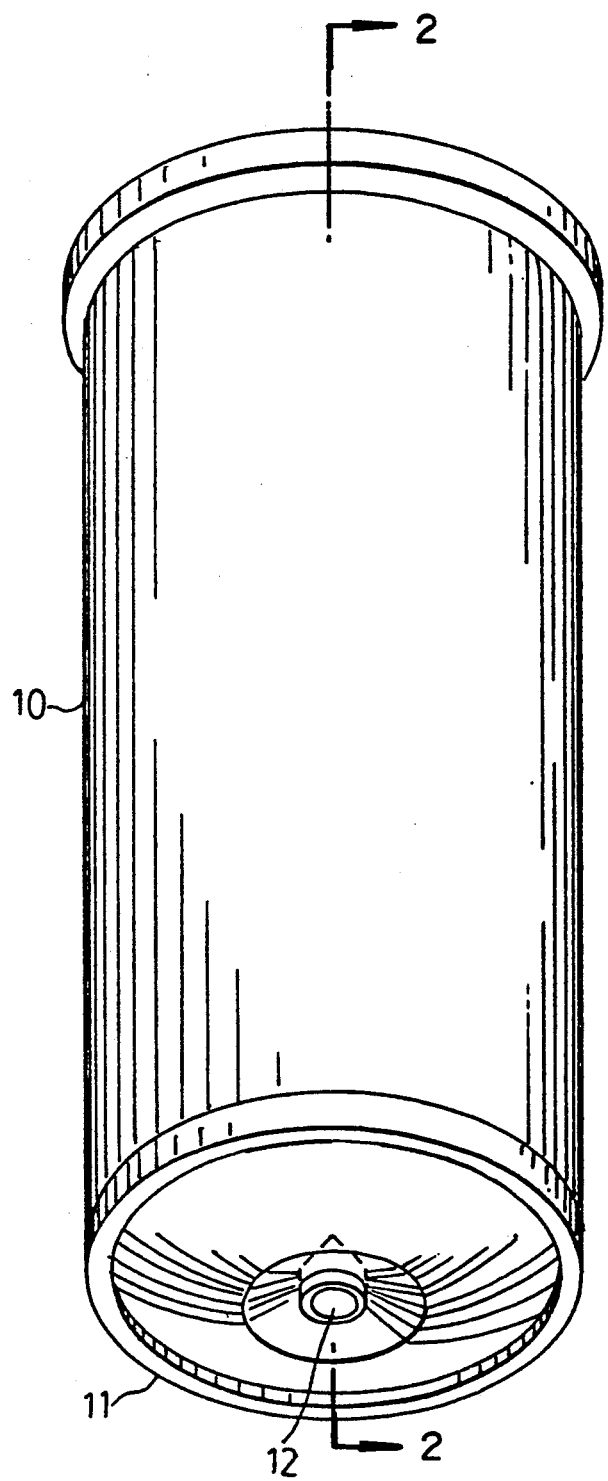
FIG. 1 is a perspective view of a showing of a conventional automatic food heating device.
Figure 2:
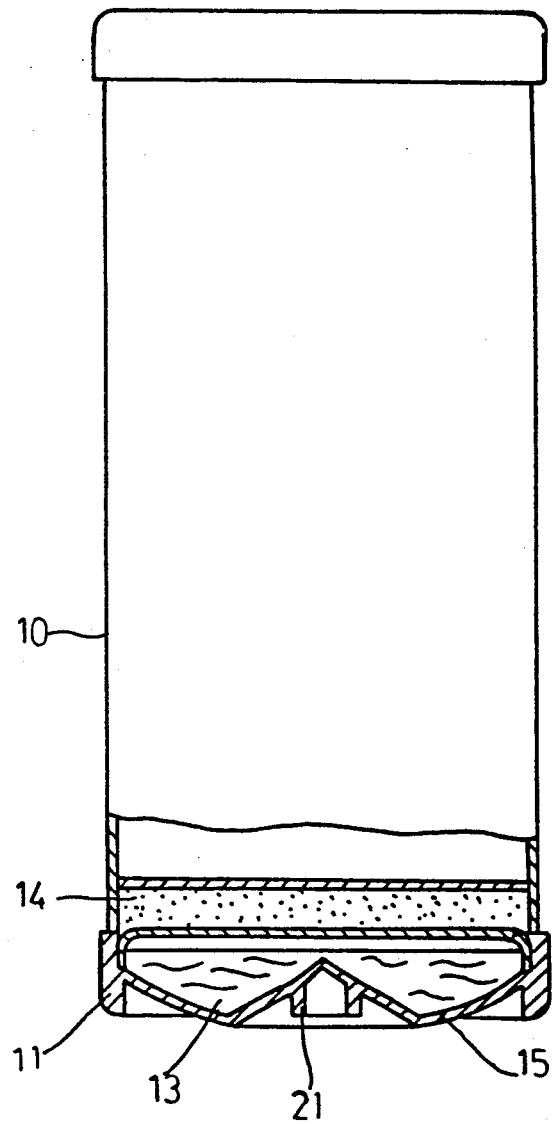
FIG. 2 is a cross-sectional view taken along line 2—2 in FIG. 1.
Figure 3:
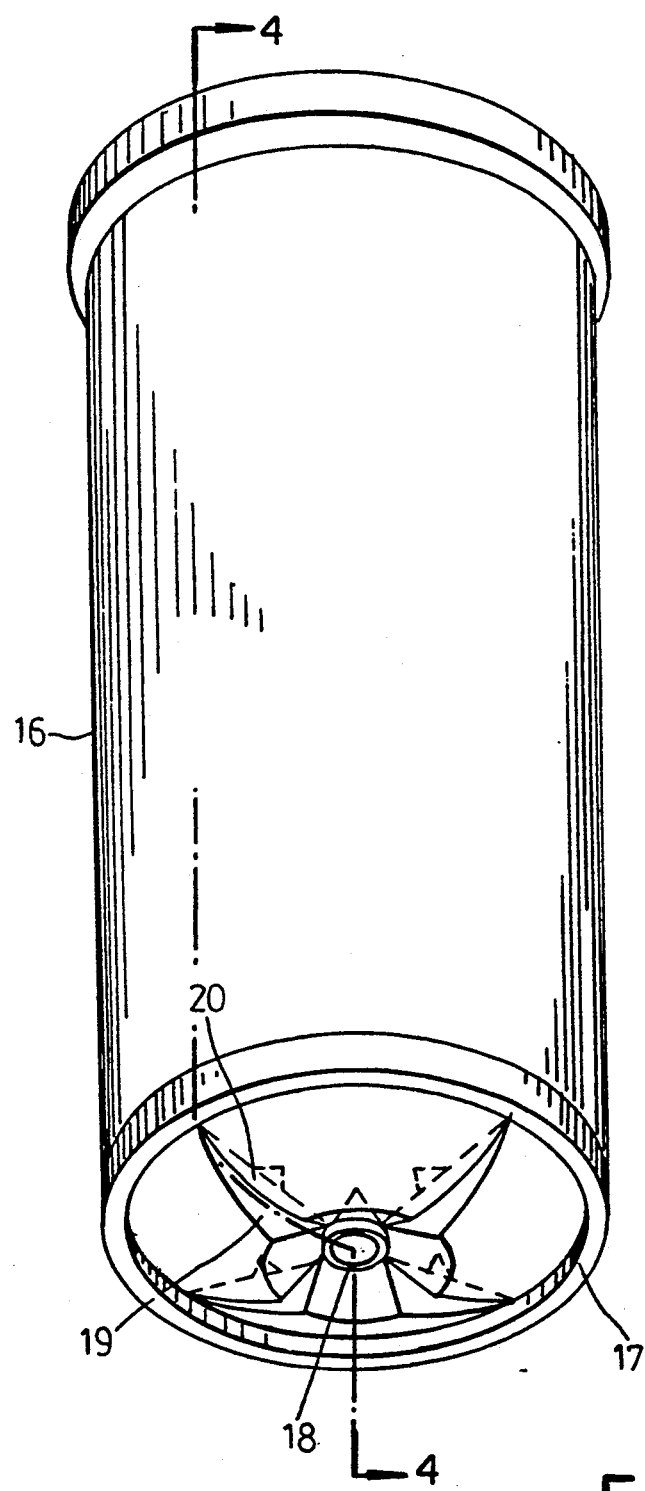
FIG. 3 is a bottom perspective view of an embodiment of the present invention.
Figure 4:
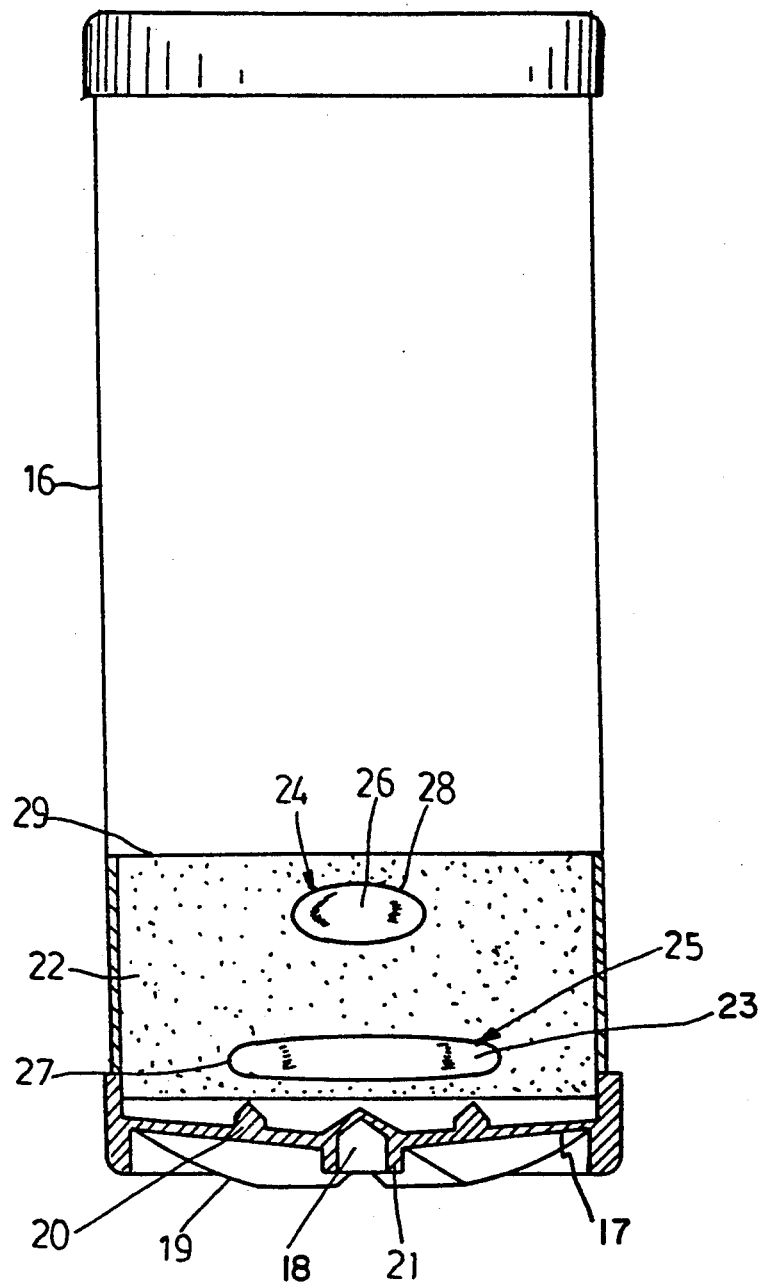
FIG. 4 is a cross-sectional view taken along line 4—4 in FIG. 3.

As shown in FIGS. 3 and 4, the present invention includes within the bottom end portion of a can 16 structurally stable quicklime 22, a medium temperature heating pack 23, a high temperature heating pack 24, and a heater lid 17.

Medium temperature heating pack 23 has therein a type of exothermic liquid which contains the components about 0.03 g salt, about 8 cc distilled water and about 0.8 cc glacial acetic acid (i.e., it contains about 0.03 g Nacl (s) plus about 8 cc $H_2O$ (1) plus about 0.8 cc $CH_3COOH$ (1)). Medium temperature pack is produced as follows: the distilled water is heated to 100° C. to purify its quality and to be sterilized. The temperature of the distilled water is then lowered to 20°–25° C. After that, salt NaCl(s) is added and the water is heated to 100° C. to dissolve completely the salt, and such that the water is stabilized and sterilized. Then glacial acetic acid ($CH_3COOH(1)$) is added and the mixture is heated slightly to about 30° C., and then cooled naturally to about 22° C. Finally the mixture is put into a normal plastic film.

The high temperature heating pack has therein a type of exothermic liquid which contains the components of about 0.02 cc salt water, about 0.8 cc glacial acetic acid and about 9 cc distilled water (their chemical formula is about 0.02 cc NaCl (aq) plus about 0.8 cc $CH_3COOH(1)$ plus about 9 cc $H_2O$ (1)). The production process is similar to that of the medium temperature heating pack, but the covering layer 28 and the ratios among the components are different from those of the medium temperature heating pack 23, (i.e., the ratios among the components of the medium temperature heating pack are 1 (NaCl) : 89 ($H_2O$) : 2.6 ($CH_3COOH$), while the ratios among the components of the high temperature heating pack are 0.5 (NaCl) : about 44.5 ($H_2O$) : about 1.3 ($CH_3COOH$); and the covering layer 28 is a special plastic film which can just be melted when the temperature is increased to 140° C.)

Referring again to the figures, can 16 has a bottom heater lid 17 which is provided with a pressing pin 18 at the mid point of its lid body 21. In the four sides surrounding pin 18 there is respectively a bending groove 19. The bottom end of groove 19 protrudes out from the inner side of the lid body and has respectively a protruding piercing body 20.

Figure 5:
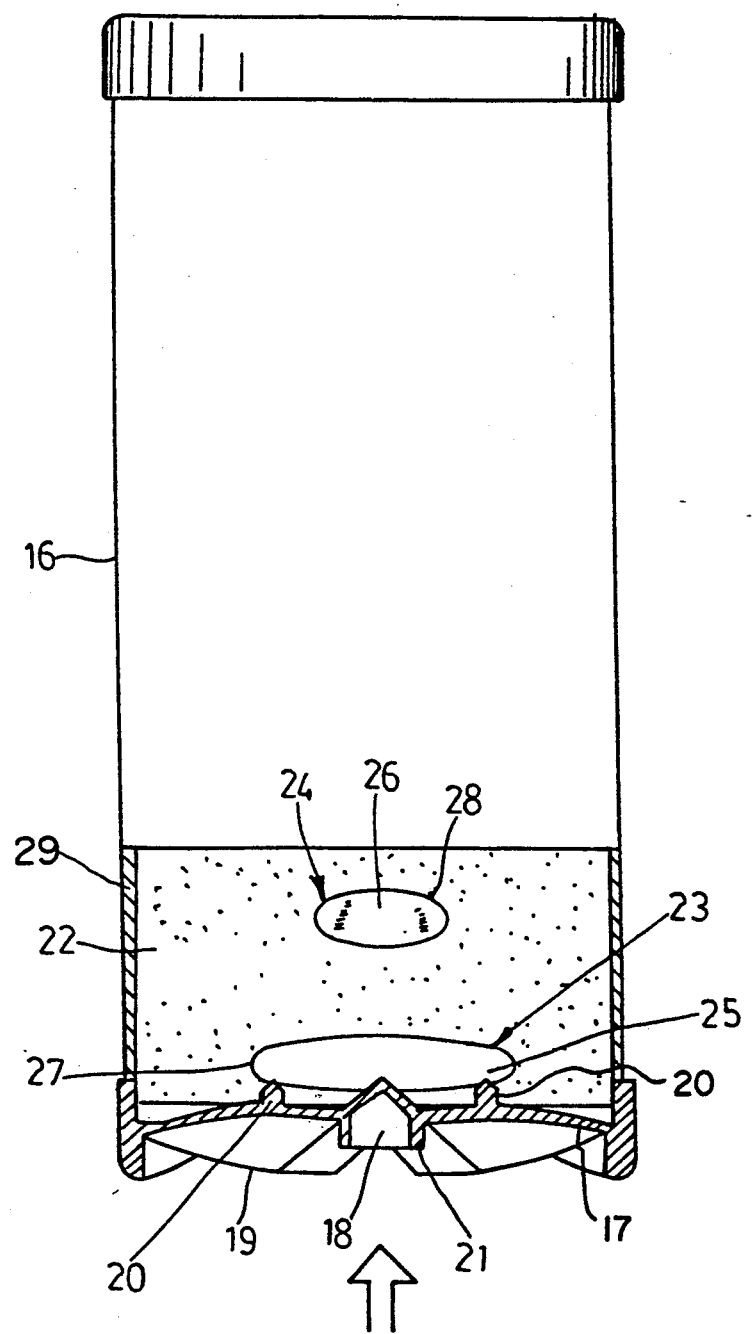
FIG. 5 is a schematic view of the present invention after the lid has been indented.
Figure 6:
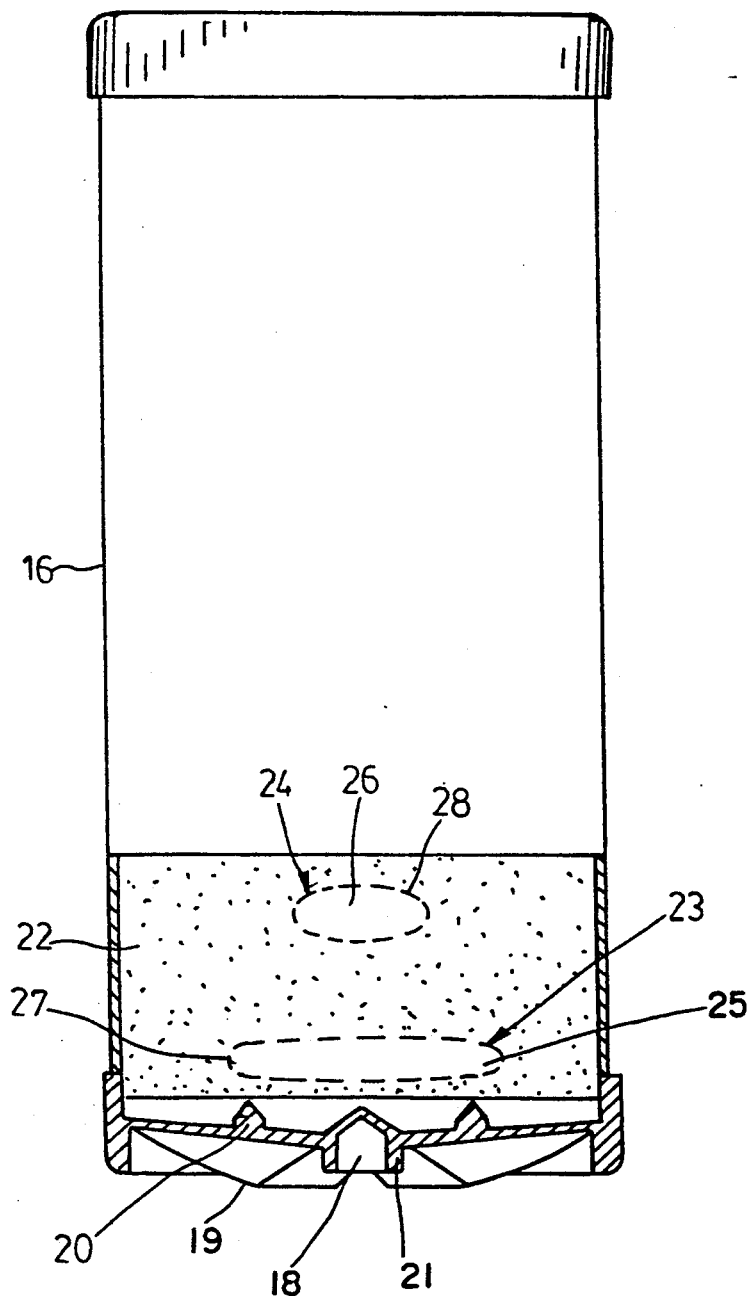
FIG. 6 is a schematic view of the present invention.
Figure 7:
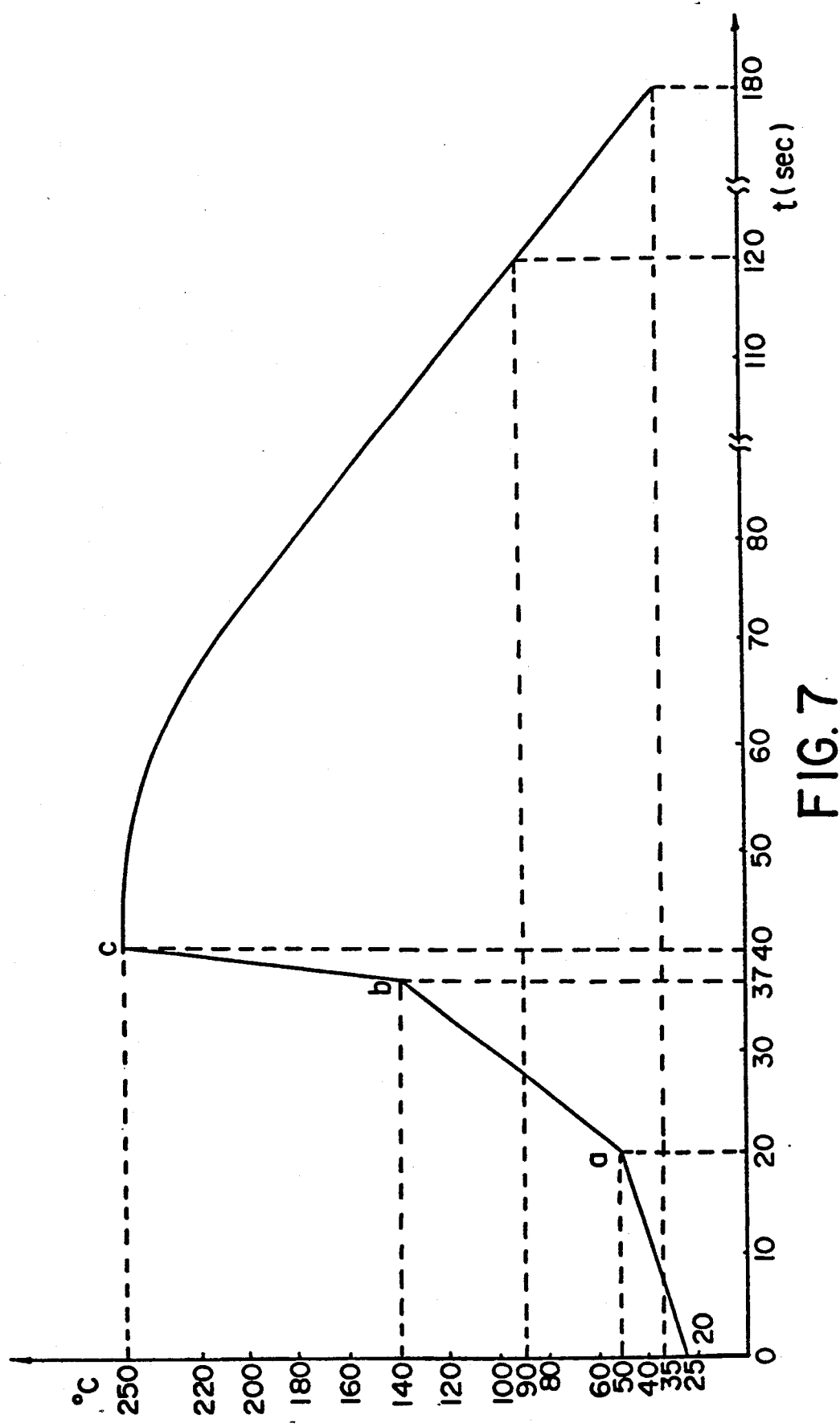
FIG. 7 is a graph of a time-temperature curve of the results of the present invention after it has been activated.

As shown in FIG. 5, when in use, the heater lid 17 has been pressed downwardly to allow the pressing pin 18 and the protruding piercing bodies 20 to pierce through the bottom of a covering layer 27 of medium temperature heating pack 23, so that the temperature raising liquid 25 in pack 23 can flow out rapidly to mix with quicklime 22 (CaO(s) ) and produce a chemical reaction. The chemical formula is $CaO(s)+NaCl(s)+CH_3COOH(l)+H_2O(l)$. Liquid 25 in pack 23 reacts first with partial quicklime to release heat thereby creating a first stage of temperature change. In the meantime, the heat produced offsets the ambient low temperature, and thereafter, it is only capable of increasing the temperature to 50° C. after 20 seconds. This is shown in FIG. 7, wherein the horizontal axis represents time while the vertical axis represents temperature and the curve increases slowly to point "a." Because the amounts of NaCl and $CH_3COOH(l)$ are small, they are exhausted antecedently, and a part of $H_2O(l)$ is left. Thereby, CaO(s) can react with the residual $H_2O(l)$. The chemical formula is $CaO(s)+H_2O(l) \rightarrow Ca(OH)(s)$. This reaction releases a lot of heat and the temperature is then raised. The heat produced needs not to offset the ambient low temperature, so that in this second stage the temperature is raised up to 140° C. after 37 seconds (as shown at point "b" in FIG. 7). CaO(s) remains partially unreacted until the temperature increases up to 140° C. At this temperature covering layer 28 of high temperature heating pack 24 melts as shown by dashed line 28 in FIG. 6 which illustrates this situation. Now temperature raising liquid 26 in the high temperature heating pack 24 is released and reacts with the residual CaO(s). The heat energy released this time also needs not to offset the ambient temperature and being at a high temperature, therefore, the temperature of the stony material in this third stage can be increased to the high temperature of 250° C. within 60 seconds (as shown by point "c" in FIG. 7). Then the temperature can decrease gradually in 2 minutes to obtain the temperature most appropriate for eating (this is the fourth stage, as shown by "d" in FIG. 7).

Thus the present invention is far better than the conventional automatically heating foods on the market which obtain a lower temperature and require a lengthy heating time. In the present invention, the residual bacteria in the foods can be effectively diminished by the high temperature of 250° C., yet still the heating time is very short (only for several decades of seconds). Hence the foods will degenerate and can be offered as hot, safe and healthful. The short heating time does not make people wait too long, thereby increasing the efficiency of use. The reacting products after heating can be absorbed by Nature, and because they are not toxic, they will not contaminate the environment.

In conclusion, the inventor made the present invention through hard study. By the unique and excellent design and technical approaches of the present invention, a high temperature of 250° C. can be achieved within a very short time, so as to effectively reduce the residual bacteria in the foods, while also avoiding degeneration of the food which could result from a lengthy heating time. Thus the foods can be offered as hot, safe and healthful and heating ingredients do not contaminate the environment. These are the unique effect of the present invention.

Having thus described the present invention, what is claimed as new, improved and practical and is desired to be secured by Letters Patent of the United States is set forth in the following claims.

What is claimed is:

1. A food heating technique for producing a high temperature in a container of food, comprising the steps of:
   providing a receiving tank in the container having a heater lid that comprises a pressing pin located at the midpoint thereof, a protruding piercing body surrounding said pin, said piercing body provided with a plurality of bending grooves;
   providing quicklime in the receiving tank;
   providing a first pack in the receiving tank, said first pack for producing a medium temperature heating and comprising a covering layer of plastic film and a first liquid mixture, said first liquid mixture that includes about 0.03 g NaCl(s), about 0.8 cc $CH_3COOH(l)$, and about 8 cc $H_2O(l)$;
   providing a second pack in the receiving tank, said second pack for producing a high temperature and comprising a covering layer of plastic film having a melting point of about 140° C. and a second liquid mixture that includes about 0.02 cc NaCl(aq), about 0.8 cc $CH_3COOH(l)$, and about 9 cc $H_2O$;
   piercing said medium temperature heating pack with said pressing pin and protruding piercing body such that said temperature raising liquid therein can rapidly mix with said quicklime; and
   creating a chemical reaction such that the temperature increases to about 250° C., thereby heating the contents of the container to reduce any residual bacteria.

2. The food heating technique for producing high temperature as claimed in claim 1, wherein said chemical reaction has a temperature-time relation which includes four stages of heating processes.

3. The food heating technique for producing high temperature as stated in claim 2, wherein the heating process in the first stage taking 0 to 20 seconds, the temperature thereof being raised from 25° C. to 50° C., the heat energy therein being supplied by NaCl, $CH_3COOH$ and a small amount of $H_2O$ and CaO; NaCl and $CH_3COOH$ being exhausted in this stage.

4. The food heating technique for producing high temperature as stated in claim 2, wherein the heat energy in the heating process of the second stage being supplied by the residual CaO and $H_2O$, the heat energy in said stage needing not to offset the ambient low temperature as in said heating process of said first stage, therefore said heat energy being able to be completely used for raising the temperature, so that the temperature being raised up to 140° C. within 37 seconds; the amount ratio of said CaO being higher than said $H_2O$, so that a small amount of CaO does not react and release heat energy.

5. The food heating technique for producing high temperature as stated in claim 2, wherein the heat energy in the heating process of the third stage being supplied by the temperature raising liquid comprised of NaCl(aq), $CH_3COOH(l)$ and $H_2O(l)$ in said high temperature heating pack, the covering layer of said pack melting at 140° C., so that said temperature raising liquid mixing with said unreacted CaO and releasing heat energy; the heat energy in said stage needing not to offset the ambient temperature too, yet the temperature now having been increased to 140° C., therefrom, the temperature being able to increased to 250° C. within several seconds, thus reaching the high temperature in a very short time.

6. The food heating technique for producing high temperature as stated in claim 5, wherein when the temperature reaches about 250° C., the chemical reaction ceases, so that the temperature of the food no longer increases, and gradually decreases to a more suitable temperature for eating within 2 minutes.

7. The food heating technique for producing high temperature as stated in claim 5 the total heating time thereof being from 0 to 60 seconds, and the temperature being raised to 250° C.

8. The food heating technique for producing high temperature as stated in claim 1, wherein the chemical reaction products thereof are able to be completely resolved by Nature, are nontoxic, and are not contaminable to the environment.

9. A food heating device for food capable of producing a high temperature in the food for a relatively short period of time, the device comprising:
 a container having a receiving tank therein;
 a heater lid that covers said receiving tank and comprises a pressing pin located at the midpoint thereof, a protruding piercing body surrounding said pin, said piercing body provided with a plurality of bending grooves;
 quicklime in the receiving tank;
 a first pack located in the receiving tank such that it can be pierced by said pressing pin, said first pack being capable of producing a medium temperature heating when pierced and comprising a first covering layer and a first liquid mixture inside said covering layer; and
 a second pack in the receiving tank, said second pack for producing a high temperature and comprising a second covering layer having a breakdown point at or below the produced medium temperature and a second liquid mixture inside said covering layer;
 said first liquid mixture being such that when released from said first pack covering layer it reacts with some of said quicklime and generates a high enough temperature to cause the breakdown of said second covering layer.

10. The food heating device as claimed in claim 9 wherein said first liquid mixture includes about 0.03 g NaCl(s), about 0.8 cc $CH_3COOH(l)$, and about 8 cc $H_2O(l)$.

11. The food heating device as claimed in claim 9 wherein said breakdown of said second pack plastic film occurs at about 140° C.

12. The food heating device as claimed in claim 9 wherein said second liquid mixture includes about 0.02 cc NaCl(aq), about 0.8 cc $CH_3COOH(l)$, and about 9 cc $H_2O$.

13. The food heating device as claimed in claim 12 wherein said second liquid mixture creates a chemical reaction such that the temperature increases to about 250° C., thereby heating the contents of the container to reduce any residual bacteria.

* * * * *